Figure 1:
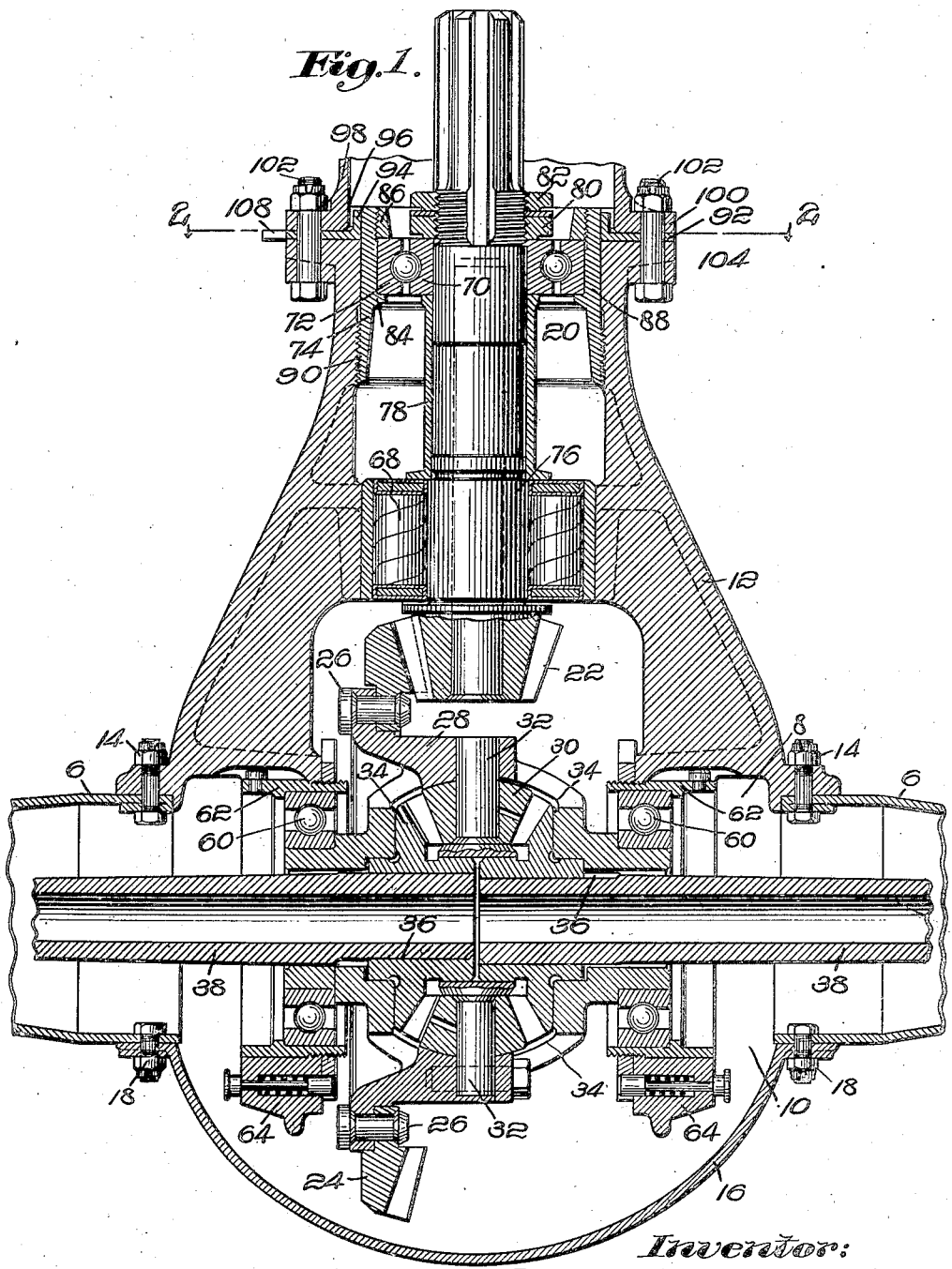

Dec. 4, 1923.

F. S. DUESENBERG 1,476,329

DRIVING AXLE FOR MOTOR VEHICLES

Filed Dec. 4, 1920     2 Sheets-Sheet 1

Inventor:
Frederick S. Duesenberg
by Emery, Booth, Janney & Varney,
Attys.

Dec. 4, 1923.

F. S. DUESENBERG 1,476,329

DRIVING AXLE FOR MOTOR VEHICLES

Filed Dec. 4, 1920    2 Sheets-Sheet 2

Inventor:
Frederick S. Duesenberg,

Patented Dec. 4, 1923.

1,476,329

UNITED STATES PATENT OFFICE.

FREDERICK S. DUESENBERG, OF ELIZABETH, NEW JERSEY.

DRIVING AXLE FOR MOTOR VEHICLES.

Application filed December 4, 1920. Serial No. 428,366.

*To all whom it may concern:*

Be it known that I, FREDERICK S. DUESENBERG, a citizen of the United States, and a resident of Elizabeth, county of Union, and State of New Jersey, have invented an Improvement in Driving Axles for Motor Vehicles, of which the following description, in connection with the accompanying drawings, is a specification, like characters on the drawings representing like parts.

This invention relates to driving axles for motor vehicles, and is more particularly concerned with an axle construction of the class in which a longitudinal shaft drives the wheel shafts through a bevel gear and pinion and differential mechanism. The invention aims to provide a convenient means of adjustment for the bevel pinion with relation to the bevel gear.

My invention will be best understood by reference to the following description, when taken in connection with the accompanying drawings of one illustrative embodiment thereof, while its scope will be more particularly pointed out in the appended claims.

Figure 2:
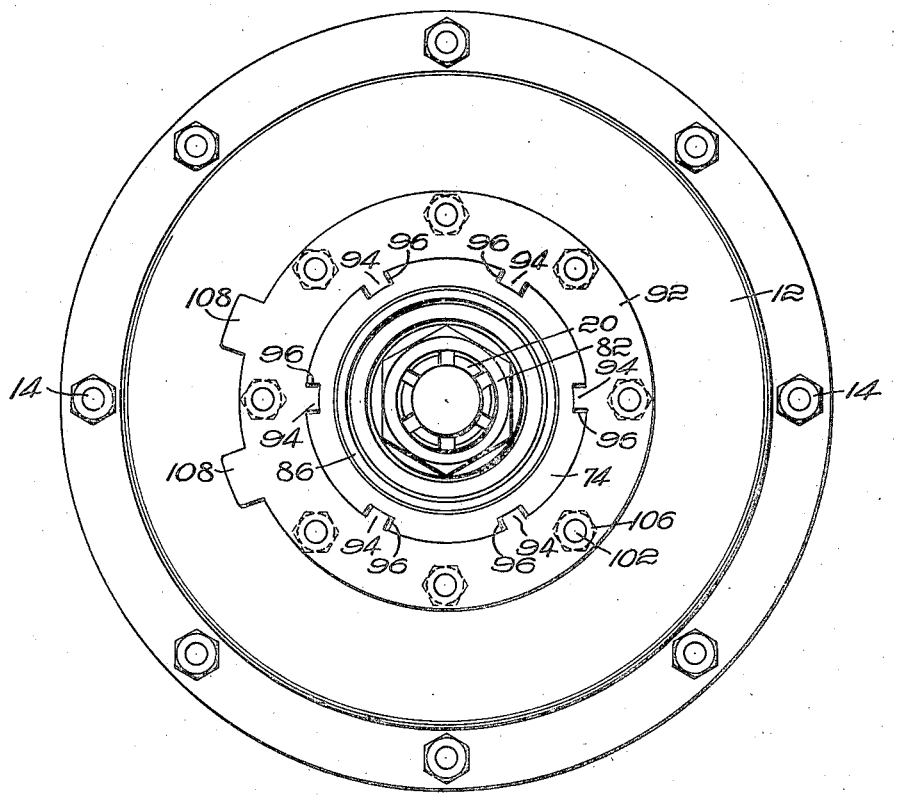

In the drawings:

Fig. 1 is a horizontal sectional view of an axle construction exemplifying my invention; and Fig. 2 is a sectional view on line 2—2 of Fig. 1.

Referring to the drawings, and to the embodiment of my invention which I have selected for exemplification, with more particular reference to Fig. 1, I have shown a rear axle having a main housing 6 provided with front and rear openings 8 and 10, one closed by a bell-shaped housing 12 secured in place by bolts 14, and the other being closed by a cover-plate 16 secured in place by bolts 18. Connected to and driven by a suitable source of power is a pinion shaft 20 (see Fig. 3), carrying at its rear end a bevel pinion 22 meshing with a bevel gear 24, the latter being suitably secured as by rivets 26 to a differential carrier 28. The latter carries a suitable differential mechanism, herein of usual construction, comprising a set of bevel pinions 30 mounted to turn on studs 32 and meshing with two bevel gears 34.

Each of the bevel gears 34 is suitably secured as by splines 36 to a shaft 38, whose outer end is appropriately connected to and drives a wheel (not shown).

The described shafts are carried in suitable bearings provided therefor. The differential carrier is mounted in a usual manner on two sets of annular ball-bearings 60 mounted in adjustable sleeves 62 held in place by bearing caps 64, all of which may be of usual construction.

The pinion shaft is mounted in suitable bearings, herein an annular ball-bearing 66 and a roller-bearing 68, the character of the latter being such as to impose no restraint on axial movement of the shaft. To this end, the roller bearing herein employed is provided with straight cylindrical rollers, and is of the type commercially known as the Hyatt.

The annular ball-bearing 66 is mounted in a novel manner which I will now describe. The bearing comprises inner and outer ball-races 70 and 72, one fixedly secured to the pinion shaft and the other to a sleeve 74. In the present embodiment, the inner race is secured to the pinion shaft by providing the latter with a shoulder 76 serving as an abutment for the forward end of a sleeve 78, whose rear end abuts against the ball-race. The latter is clamped against this sleeve, and the sleeve in turn against the shoulder, by a nut 80 and lock-nut 82, threaded onto the pinion shaft. Thus it is evident that any axial motion of the latter is always imparted to the pinion 22, and hence moves the latter radially in and out with reference to the gear 24, thereby meshing the teeth to a greater or less depth, depending upon the direction in which the pinion is moved.

The outer ball-race 72 is suitably secured to the sleeve 74, as by providing the latter with a shoulder 84 serving as an abutment against which the ball-race is clamped by a ring 86 threaded into the rear end of the sleeve. The latter is provided with a smooth cylindrical portion 88, which snugly fits a corresponding bore in the rear end of the bell-shaped housing 12, and thus is capable of sliding forward and backward to effect axial adjustment of the pinion shaft and pinion. It should be understood, of course, that the outer cylindrical surface of the sleeve is co-axially disposed with reference to the pinion shaft. Axial movement of the sleeve to effect the adjustment of the pinion is herein conveniently accomplished by the provision of a threaded portion 90 on the sleeve, screwed into a corresponding threaded part in the bell-shaped housing 12. It follows that rotation of the sleeve is accompanied by axial movement of the outer ball-race 72.

Since the ball-races are grooved to receive the balls, it naturally follows that the inner ball-race will move in unison with the outer ball-race, and that since the inner race is fixedly secured to the pinion shaft, the latter will partake of the axial movement due to the rotation of the sleeve. It should be understood, of course, that the thrust developed by the pinion is received by the ball-bearing 66 in the usual way, owing to the grooved formation of the ball-races.

Rotation of the adjusting sleeve 74 is herein conveniently effected without the necessity of providing an opening for access to the interior. To this end, I have herein provided an adjusting member conveniently in the form of a plate 92, which on the one hand is accessible from the exterior of the housing, and on the other hand is suitably connected to the sleeve 74 to rotate the latter, while still allowing it to move axially with relation to such plate. One convenient way of accomplishing this is by providing the latter with one or more, herein a plurality of, teeth 94 struck up from the plate and received in notches 96 provided in the sleeve 74, as best shown in Fig. 4.

In some motor vehicles, a universal joint is provided between the forward end of the pinion shaft and the rear end of the propeller shaft which drives it, and the forward end of the propeller shaft is connected to the main shaft of the transmission by another universal joint. In another type of construction, there is but one universal joint employed,—that which is at the forward end of the propeller shaft, and the latter is enclosed in a torque tube, whose rear end is fixedly secured to the axle housing. The latter type of construction is herein selected for exemplification, and I have shown a torque tube 98 provided at its rear end with a flange 100, which is secured to the bell housing 12 by bolts 102 passing through the flange 100, as well as through a flange 104 at the forward end of the bell housing. These bolts also pass through holes 106 provided in the adjusting plate 92, and hence the latter is not only clamped between the flanges 100 and 104 and held against rotation thereby, but is additionally secured against rotation by the fact that the bolts preferably snugly fit the openings in the plate. If desired, however, the openings might be made sufficiently large to permit the plate to be turned by simply loosening the bolts and relieving the clamping pressure. If, however, the bolts snugly fit the openings, they must be removed before the plate can be turned. This can be done, however, without disassembling any other parts, and the adjustment can be effected with great ease and convenience. Preferably, the plate has suitable provision for convenient rotation by an appropriate tool such as a spanner, and to this end is herein provided with projecting lugs 108. If desired, these may be struck with a hammer to effect rotation of the plate. After the adjustment has been made, the bolts are replaced and tightened to clamp the parts together.

Having thus described one embodiment of my invention, but without limiting myself thereto, what I claim and desire by Letters Patent to secure is:

1. In an axle construction, the combination of a housing, shafts mounted to turn therein, driving mechanism therefor including a bevel gear, a torque tube secured to said housing, a driving shaft housed in said torque tube and carrying a bevel pinion meshing with said gear, and means for adjusting said pinion axially, said means including a part exposed at the exterior of said housing where it is accessible for adjusting said pinion.

2. In an axle construction, the combination of a housing, shafts mounted to turn therein, driving mechanism therefor including a bevel gear, a torque tube secured to said housing, a driving shaft housed in said torque tube and carrying a bevel pinion meshing with said gear, and means for adjusting said pinion axially, said means including a part extending from the interior to the exterior of said housing and intermediate the latter and said torque tube to a point exterior to the same where it is accessible for adjusting said pinion.

3. In an axle construction, the combination of a housing, shafts mounted to turn therein, driving mechanism therefor including a bevel gear, a torque tube secured to said housing, a driving shaft housed in said torque tube and carrying a bevel pinion meshing with said gear, and means for adjusting said pinion axially, said means including an adjusting plate which is interposed between the rear end of said torque tube and the front end of said housing.

4. In an axle construction, the combination of a housing, shafts mounted to turn therein, driving mechanism therefor including a bevel gear, a torque tube secured to said housing, a driving shaft housed in said torque tube and carrying a bevel pinion meshing with said gear, and means for adjusting said pinion axially, said means including an adjusting element interposed between the rear end of said torque tube and the front end of said housing and means for clamping said tube and said housing together and said adjusting element therebetween.

In testimony whereof, I have signed my name to this specification.

FREDERICK S. DUESENBERG.